(12) United States Patent
Noelle (10) Patent No.: US 9,596,021 B2
(45) Date of Patent: Mar. 14, 2017

(54) METHOD FOR IDENTIFYING INTERFERING TRANSMITTERS FROM A PLURALITY OF KNOWN SATELLITE TRANSMITTERS

(71) Applicant: Siemens Convergence Creators GmbH, Vienna (AT)

(72) Inventor: Michael Noelle, Vienna (AT)

(73) Assignee: Siemens Convergence Creators GmbH, Vienna (AT)

( * ) Notice: Subject to any disclaimer, the term of this patent is extended or adjusted under 35 U.S.C. 154(b) by 0 days.

(21) Appl. No.: 15/030,449

(22) PCT Filed: Oct. 2, 2014

(86) PCT No.: PCT/EP2014/071175
§ 371 (c)(1),
(2) Date: Apr. 19, 2016

(87) PCT Pub. No.: WO2015/062810
PCT Pub. Date: May 7, 2015

(65) Prior Publication Data
US 2016/0254856 A1    Sep. 1, 2016

(30) Foreign Application Priority Data
Oct. 31, 2013  (AT) .............................. A 50712/2013

(51) Int. Cl.
| H04B 7/185 | (2006.01) |
| H04B 17/345 | (2015.01) |
| H04L 25/02 | (2006.01) |

(52) U.S. Cl.
CPC ....... *H04B 7/18513* (2013.01); *H04B 17/345* (2015.01); *H04L 25/0242* (2013.01)

(58) Field of Classification Search
CPC .................................................. H04B 7/18513
See application file for complete search history.

(56) References Cited

U.S. PATENT DOCUMENTS 4,653,053 A * 3/1987 Pelchat .............. H04B 7/18519
375/130
5,379,445 A * 1/1995 Arnstein .............. H04B 1/1027
327/331

FOREIGN PATENT DOCUMENTS

WO    WO 9409571 A1    4/1994

OTHER PUBLICATIONS

Bischof CH. H. et al; "LAPACK: Prtable lineare Algebra-Software für Supercomputer1)"; Informationstechnik IT, Oldenbourg Verlag, München; vol. 34; No. 1; pp. 44-49; ISSN: 0179-9738; XP000290486; 1992.

(Continued)

*Primary Examiner* — Tuan H Nguyen
(74) *Attorney, Agent, or Firm* — Cozen O'Connor (57) ABSTRACT

A method for identifying interfering transmitters, wherein, for each of the satellite transmitters present, a comparison parameter is identified for each transmitter, where the signal is divided into signal periods, each of the samples is normalized, a sampling vector is then created for each of the normalized samples, the sampling vectors are entered into a signal matrix, the elements of the signal matrix are normalized, a singular value decomposition of the signal matrix is performed, and lines of a unitary matrix identified for the signal are used as a comparison parameter for preparation of the signal, and where an interference signal is identified for determining an interfering transmitter for the signal, and a comparison parameter is likewise identified therefor.

15 Claims, 11 Drawing Sheets

(56) References Cited

OTHER PUBLICATIONS

Anderson E. et al; "LAPACK: A Prtable Linear Algebra Library for High-Performance Computers"; Proceedings of the Supercomputing Conference, New York, Nov. 12-16, Washington, IEEE Comp. Soc. Press; vol. CON.3; pp. 2-11; ISBN: 978-0-8186-2056-0; DOI: 10.1109/SUPERC.1990.129995; XP010019922; 1990.

* cited by examiner

METHOD FOR IDENTIFYING INTERFERING TRANSMITTERS FROM A PLURALITY OF KNOWN SATELLITE TRANSMITTERS

CROSS-REFERENCE TO RELATED APPLICATIONS

This is a U.S. national stage of application No. PCT/EP2014/071175 filed 2 Oct. 2014. Priority is claimed on Austrian Application No. A50712/2013 filed 31 Oct. 2013, the content of which is incorporated herein by reference in its entirety.

BACKGROUND OF THE INVENTION

1. Field of the Invention

The invention relates to a method for comparing signals, and more particularly, to a method for identifying interfering transmitters from among a plurality of known satellite transmitters, where methods are utilized in the context of quantum information theory for the comparison of the signals.

2. Description of the Related Art

What is understood by the concept $V^\dagger$ of a matrix in the context of the present application is always the adjoint matrix of the matrix V, which is obtained as the conjugate complex matrix of the transposed matrix of V.

Different methods of comparing individual signals with one another are known from the prior art. In particular, individual signals can be transformed via different transformations and the transformation results thus determined can be compared with one another. For certain types of signals, it can be assumed that they each have succeeding signal periods within which the signal has similar signal shapes, though there may also by all means be deviations between the signal shapes. Such signal periods can have arbitrary durations. These signals are represented by different values, such as by sample values that have been recorded at specific sampling time instants.

At present, there is a desire to recognize specific characteristics of substantially periodic signals in an effective manner and if necessary to associate these characteristics with different signal transmitting devices.

The increasing demand for satellite communication links, which has resulted in a high number of different satellite signals, has subsequently led to occurrences of signal interference as a consequence of poor antenna installations. Other reasons for possible signal interference problems may lie in terrorist-related or politically motivated disturbances, but they may also simply be due to the fact that the operators of a station have forgotten to switch off a transmitter. For the operators of satellites, it is therefore necessary not merely to be able to detect signal interference problems, but also to identify their causes and to localize them geographically in order to enable the interfering transmitter to be tracked down without delay.

However, most of the methods known from the prior art have a major disadvantage, i.e., it is necessary to have at least two satellites available when determining the interfering transmitter.

SUMMARY OF THE INVENTION

In view of the foregoing, it is therefore an object of the present invention to identify individual interfering transmitters based on a single signal picked up from a satellite.

This and other objects and advantages are achieved in accordance with the invention by a method for preparing a signal in order to identify interfering transmitters from among a plurality of known satellite transmitters, where, a signal is determined for each of the satellite transmitters present by, in particular equidistant, sampling of each respective signal strength and a comparison parameter for the transmitter is determined for each signal, and where a) the signal is subdivided into a number of succeeding signal periods of predefined equal length, b) each of the sample values is mapped via a constant and monotonically increasing or decreasing normalization function to a normalized sample value within a predefined normal interval, in particular the interval between 0 and 1, c) a sampling vector having two elements is produced for each of the normalized sample values, where the first element of said sampling vector corresponds to the normalized sample value and the second element thereof is chosen such that a vector norm applied to the sampling vector yields the value 1, d) the elements of the sampling vectors are each entered into a signal matrix, where each element originating from the same signal period is entered into the same row of the signal matrix, e) the first and second elements of sampling vectors that were determined at a specific sampling time instant in relation to the sample value determined at the start of the respective signal period are each arranged in the same column of the signal matrix, where separate columns are each provided for the first and second element, f) the elements of the signal matrix are normalized such that the application of a predefined vector norm to the signal matrix always yields the value 1, or g) a singular value decomposition of the signal matrix is carried out, this being decomposed into the following product representation, $$M = USV^\dagger \qquad \text{Eq. 1}$$

where U and V are each unitary matrices, and h) in order to prepare the respective signal for the comparison, one or more rows of the unitary matrix $V^\dagger$ determined for the respective signal are each selected as a comparison parameter and assigned to the respective signal. In accordance with the invention, upon detection of an interfering transmitter, an interference signal is determined for each signal emitted by the interfering transmitter by, in particular equidistant, sampling each respective signal strength and a comparison parameter is likewise determined for said interference signal in accordance with steps a) to h), with the same approach being used for the determination of the comparison parameter for the respective signal and the comparison parameter for the interference signal.

In accordance with the invention, the comparison parameter for the interfering transmitter is compared with each of the comparison parameters for the transmitters and, in each case, a dimension value is held available which indicates the degree to which the signal of the interfering transmitter matches the signal of the respective satellite transmitter.

Preferably, the first and second elements, which advantageously reflects their temporal sequence, are arranged such that the first and second elements of sampling vectors are each ordered into columns of the signal matrix such that first elements originating from an earlier sampling time instant are in each case arranged into columns having a smaller column index than first elements originating from a later sampling time instant, and second elements originating from an earlier sampling time instant are each arranged into columns having a smaller column index than second elements originating from a later sampling time instant.

In a preferred method for assigning first and second elements to columns of the signal matrix, the first and second elements of sampling vectors are each ordered into columns of the signal matrix such that, in a signal matrix having n=2l columns, all of the first elements are arranged into the columns 1 to l and all of the second elements are arranged into the columns l+1 to 2l or the first and second elements ($q_i$, $\bar{q}_i$) created at the same i-th sampling time instant are each arranged in the columns 2i−1 and 2i, where $1 \leq i \leq l$.

In order to enable individual deviations from the period shape to be advantageously detected, it can be provided that the signal is in each case assigned one row or multiple rows of the unitary matrix $V^\dagger$ as a comparison parameter, in which event in particular the second row of the unitary matrix $V^\dagger$ is referred to.

In an exemplary mapping of the individual sample values into first and second elements, for the mapping of the respective signal to the normal interval, the maximum value and the minimum value of the sample values of the respective signal are determined where, for the maximum sample value, the first element is set to a maximum interval value, in particular the value 1, and the second element is set to the value 0, and where, for the minimum sample value, the second element is set to a maximum interval value, in particular the value 1, and the first element is set to the value 0.

A normalization of the individual elements of the signal matrix provides that the entire signal matrix is multiplied by a weighting factor w which corresponds to the reciprocal of the root of half of the number of matrix elements, in particular that $$w = \sqrt{\frac{2}{mn}}$$

is chosen, where m corresponds to the number of rows and n to the number of columns of the signal matrix.

In order to enable signals that are not sampled equidistantly with respect to time to be advantageously captured, sampling time instants and equidistant sampling intervals are predefined in advance within the signal period, an interpolation function which has a signal shape predefined by the signal values and the sampling time instants and sampling intervals is determined for the signal, and the comparison parameter for the signal is determined based on a further signal that is determined by sampling the interpolation function at the predefined sampling time instants.

In order to enable individual signals that have been prepared in accordance with the invention for a comparison to be compared with one another, a comparison parameter is determined for each of the two signals, and for the comparison of the two signals a distance value is created for the two signals by applying a distance dimension to the comparison parameters assigned to the respective signals and holding the thus determined dimension value available as a comparison value for the agreement of the signals. $D(v_1, v_2) = \sqrt{1 - |v_1^\dagger v_2|^2}$, where $v_1$ is a column of the matrix $V^*_1$ assigned to the first signal $S_1$ and where $v_2$ is a column of the matrix $V^*_2$ assigned to the second signal $S_2$. It holds here that $(v^*)_{ij} = (V^*_{ij})$.

A preferred determination of the first and second elements from the measured values can be performed by determining the first element of the sampling vector according to $q_i = \sqrt{p_i}$ and the second element in particular according to $\bar{q}_i \sqrt{1-p_i}$, or by determining the first element of the sampling vector according to $q_j = e^{i\Phi_j}\sqrt{p_j}$, and the second element in particular according to $q_j = e^{i\chi_j}\sqrt{1-p_j}$.

In particular, one day or an equally long time period is used in each case as the duration of the signal periods.

A preferred identification of the interfering transmitter provides that a satellite transmitter for which a dimension value has been determined indicating a great degree of agreement, in particular the dimension value indicating the greatest degree of agreement, is identified as the interfering transmitter.

A program for performing a method in accordance with the invention can be stored on a data medium.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 4*a* to 6*b* show graphical plots of individual signal components of the matrixes U and V;

A preferred embodiment of the invention is described in more detail below with reference to an exemplary embodiment.

DETAILED DESCRIPTION OF THE EXEMPLARY EMBODIMENTS

Figure 1:
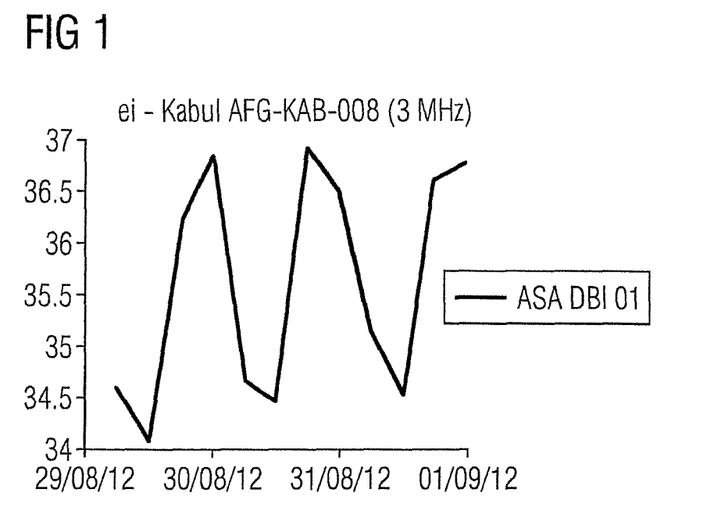
FIG. 1 is a graphical plot of a signal consisting of a number of sample values recorded over a period of three days with four measurements per day.
Figure 2A:
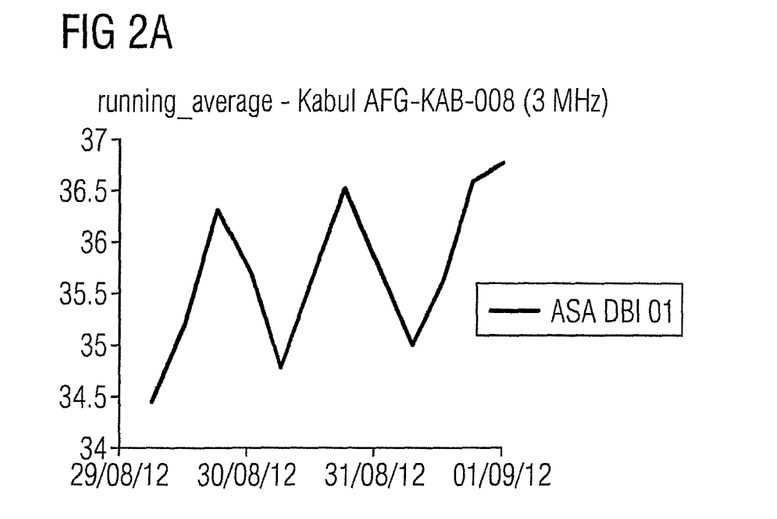
FIG. 2 is a graphical plot of a running average of the signal is shown in FIG. 1.
Figure 2B:
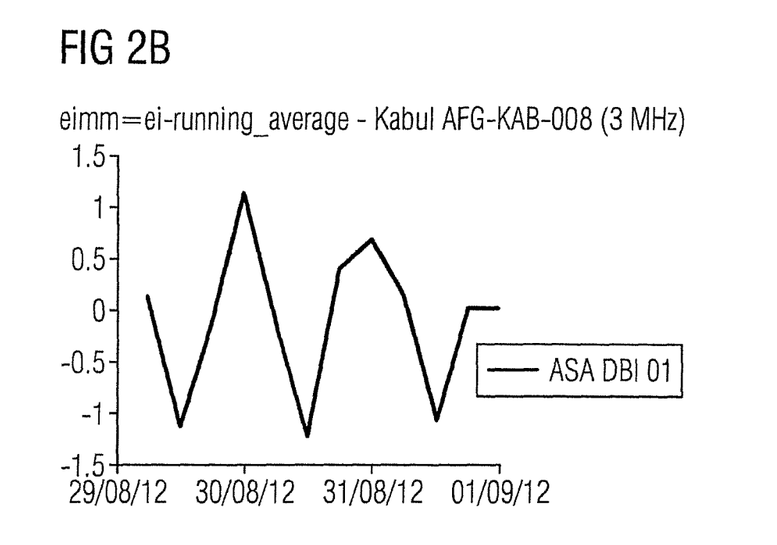
FIG. 2*b* is a graphical plot of the deviation of the recorded signal from the running average of FIG. 2.
Figure 3A:
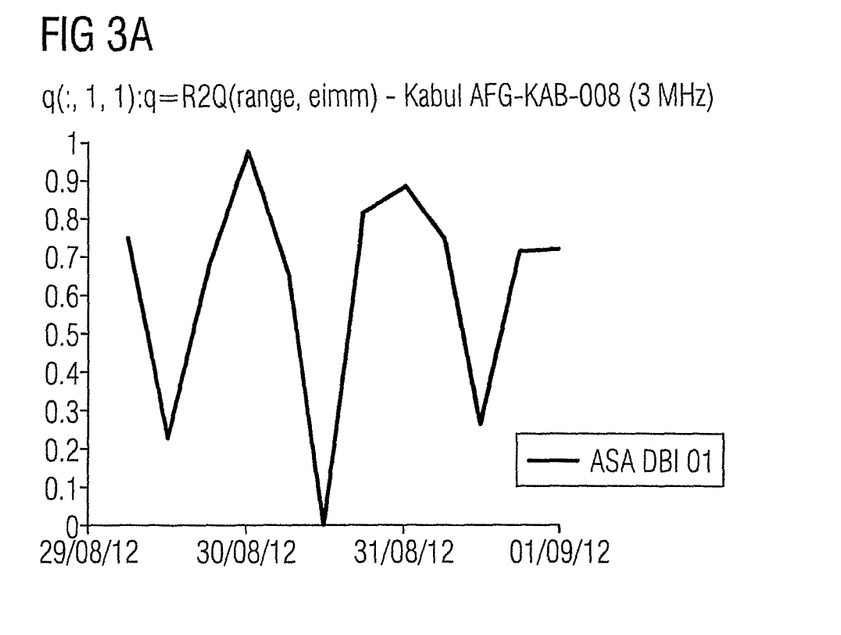
FIG. 3 is a graphical plot of the variation of with the respect to time of the elements of one sampling vector.
Figure 3B:
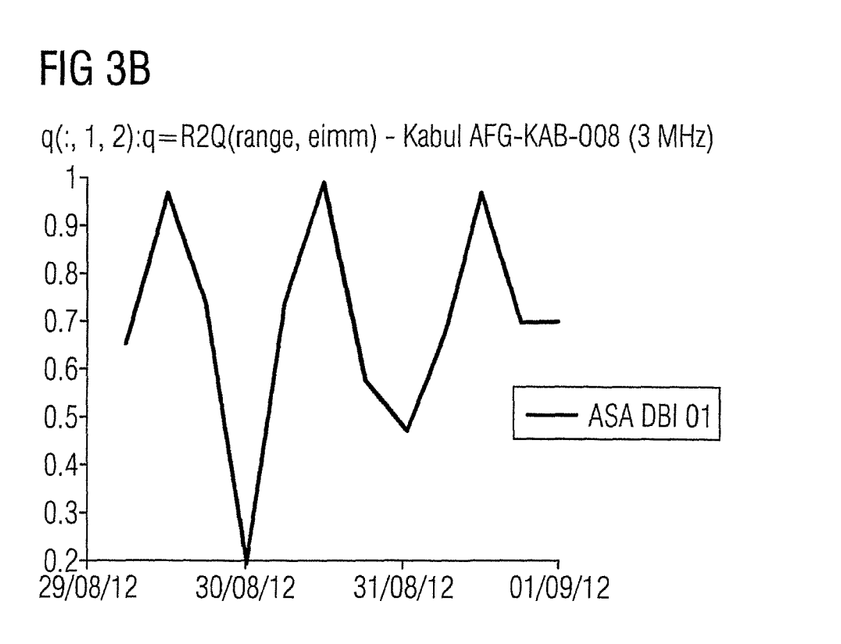
Figure 4A:
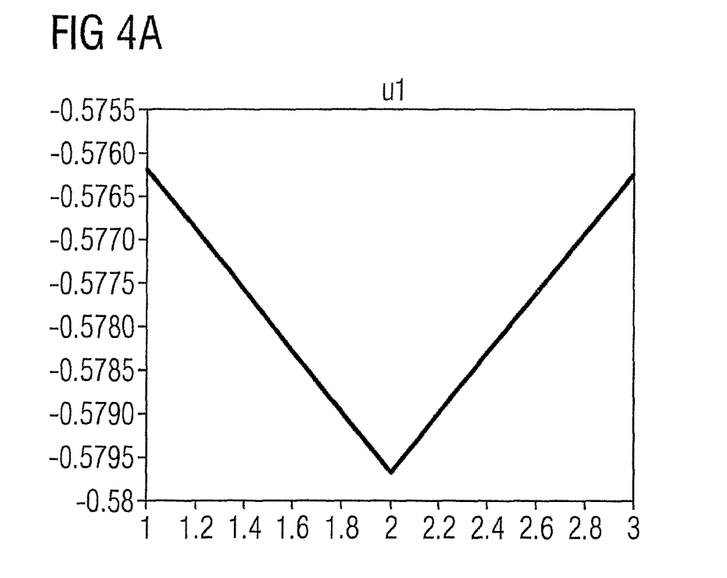
Figure 4B:
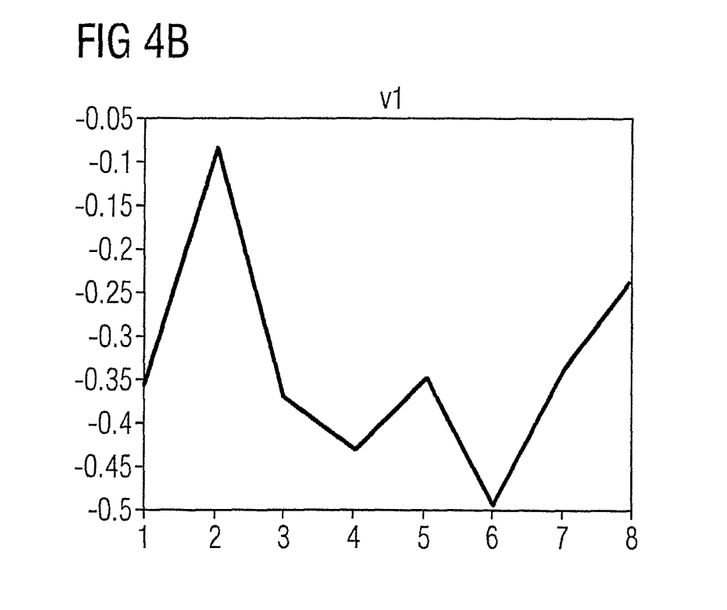
Figure 5A:
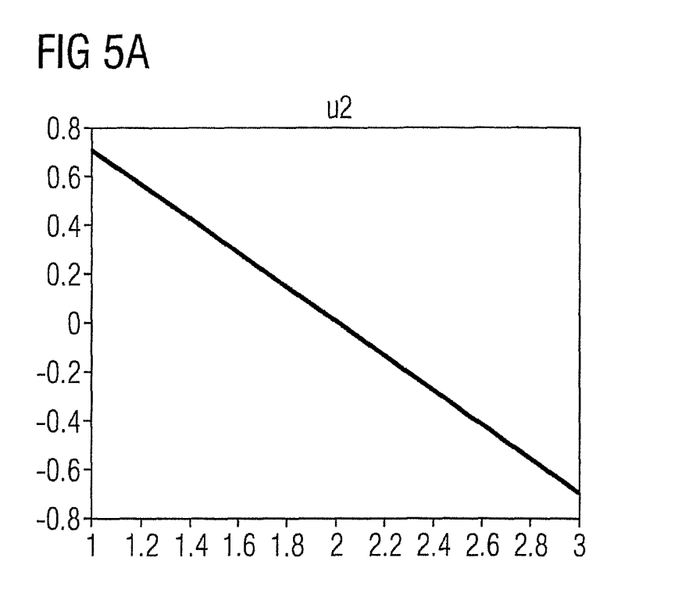
Figure 5B:
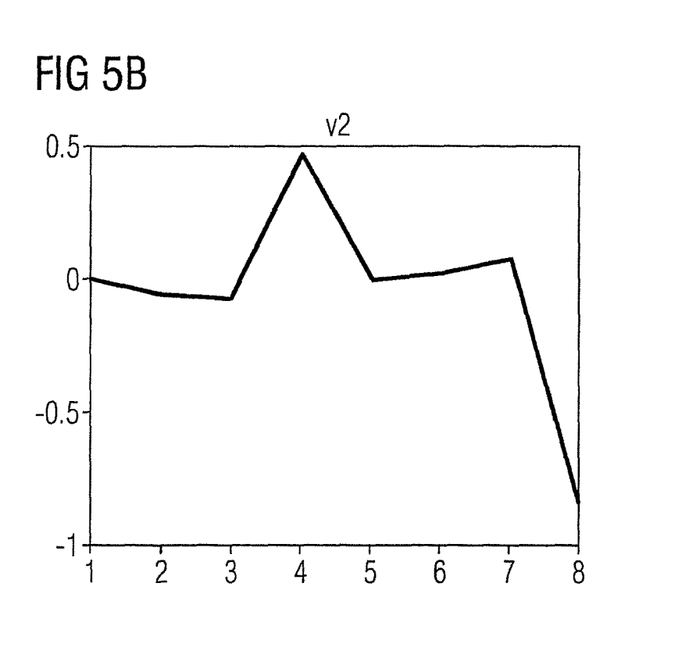
Figure 6:
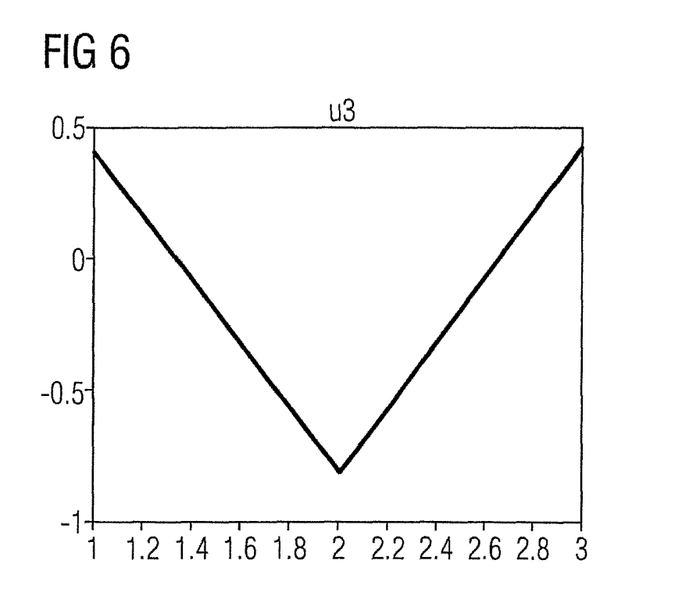
Figure 7:
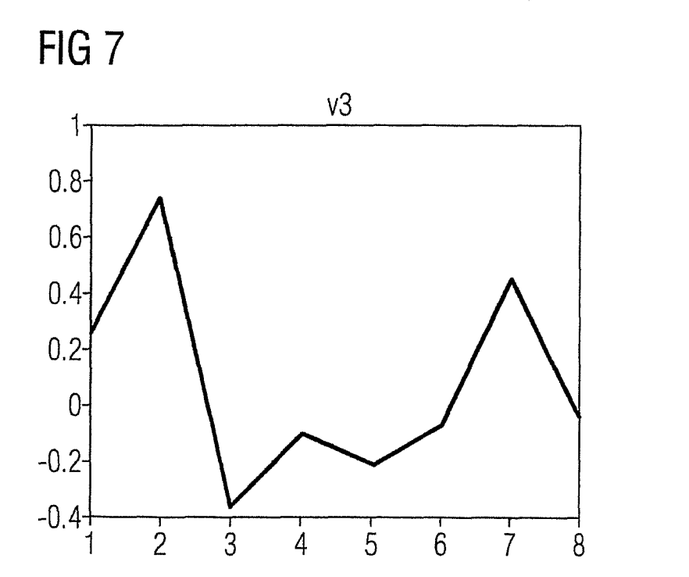
FIG. 7 is a graphical plot of the third row of the matrix $V^\dagger$.

FIG. 1 shows a signal consisting of a number of sample values $E_i$ that have been recorded over a period of three days with four measurements per day. In order to make specific signal fluctuations more easily visible, a running average of the signal is shown in FIG. 2a. FIG. 2b shows the deviation of the recorded signal from the running average. FIGS. 3a and 3b show the variation with respect to time of the elements of one sampling vector. FIGS. 4a to 6b each show individual signal components of the matrices U and V in the form of graphs. FIG. 4a shows the first column of the matrix U. FIG. 4b shows the first column of the matrix V. FIG. 5a shows the second column of the matrix U as well as the second column of the matrix V. FIG. 6 shows the third column of the matrix U. FIG. 7 shows the third column of the matrix V.

Figure 8A:
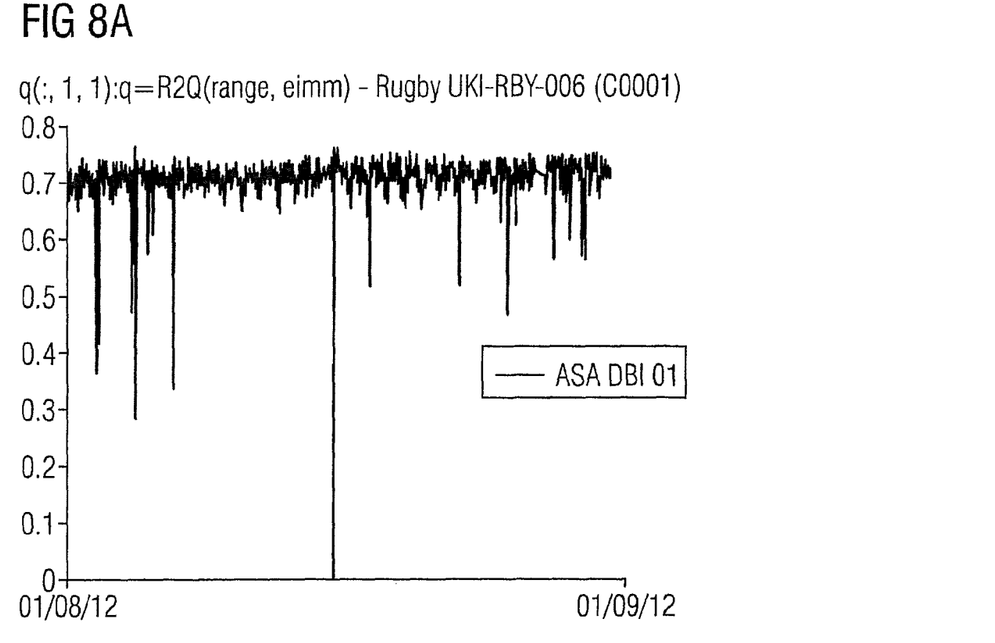
FIG. 8*a* is a graphical plot of the value of the first element of the sampling vector plotted over time.
Figure 8B:
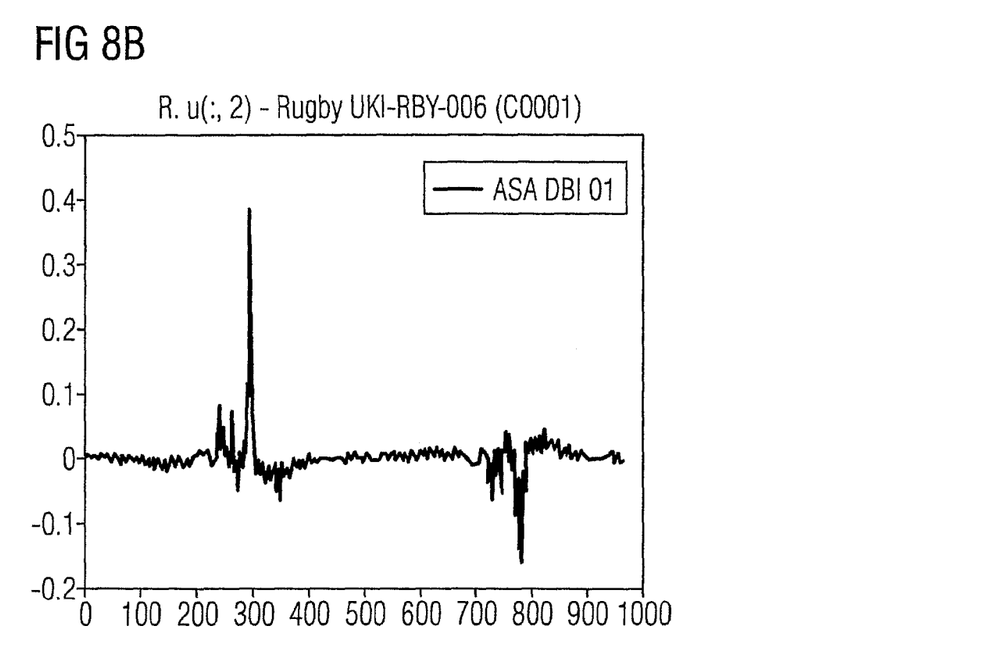
FIG. 8*b* is a graphical plot of the second column of the matrix V which is characteristic of the signal.
Figure 9A:
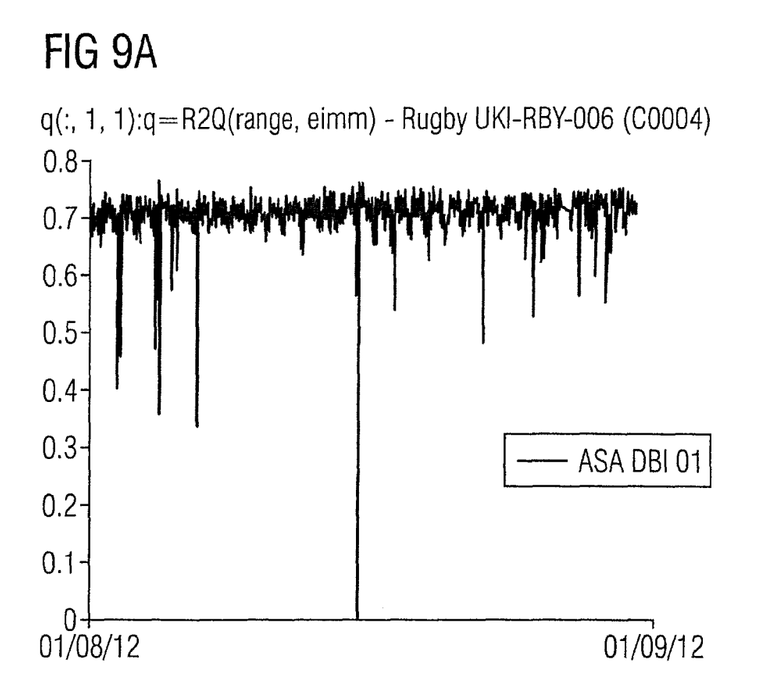
FIG. 9*a* shows a further example of signal values of the same antenna with a different carrier within a timespan of one month.
Figure 9B:
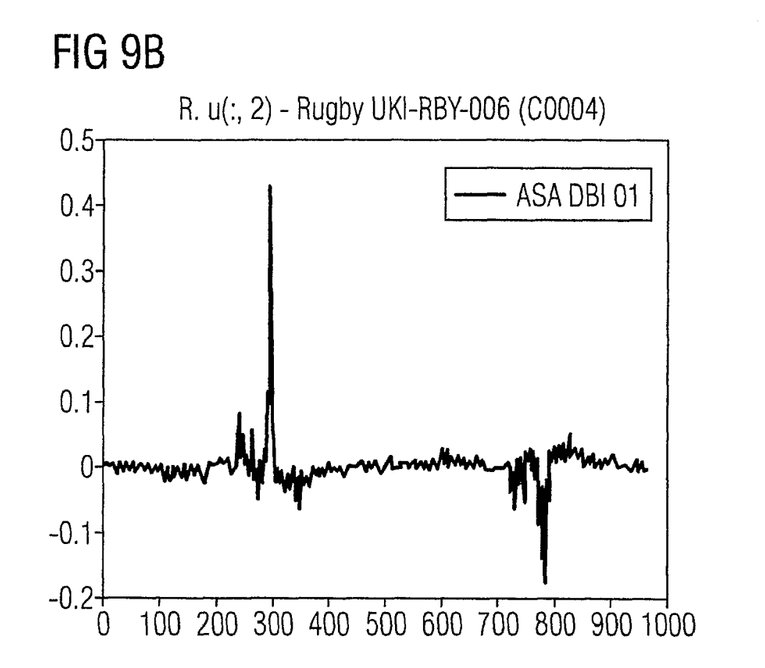
FIG. 9*b* is a further graphical plot of the second column of the matrix V which is characteristic of the signal of FIG. 9*a*.
Figure 10A:
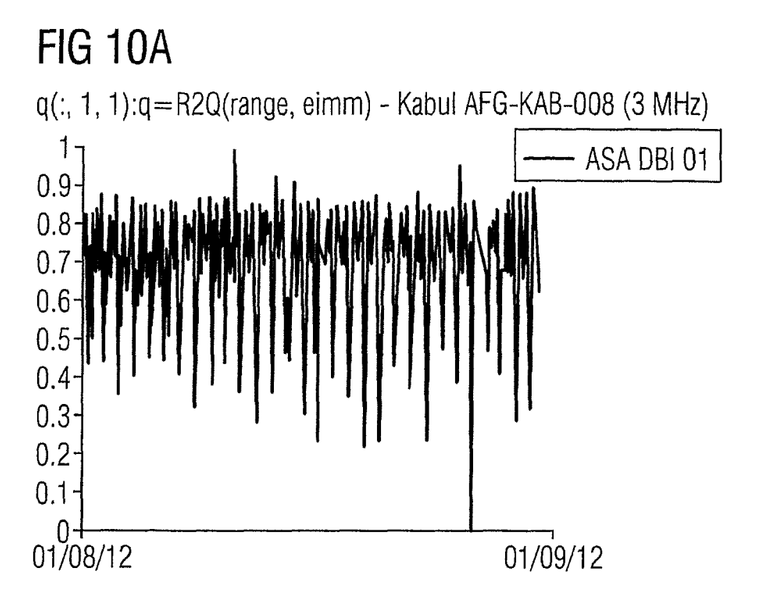
FIGS. 10*a*, 10*b*, 11*a* and 11*b* show graphical plots analogous to FIGS. 8*a* and 8*b* for a station in Kabul, Afghanistan.
Figure 10B:
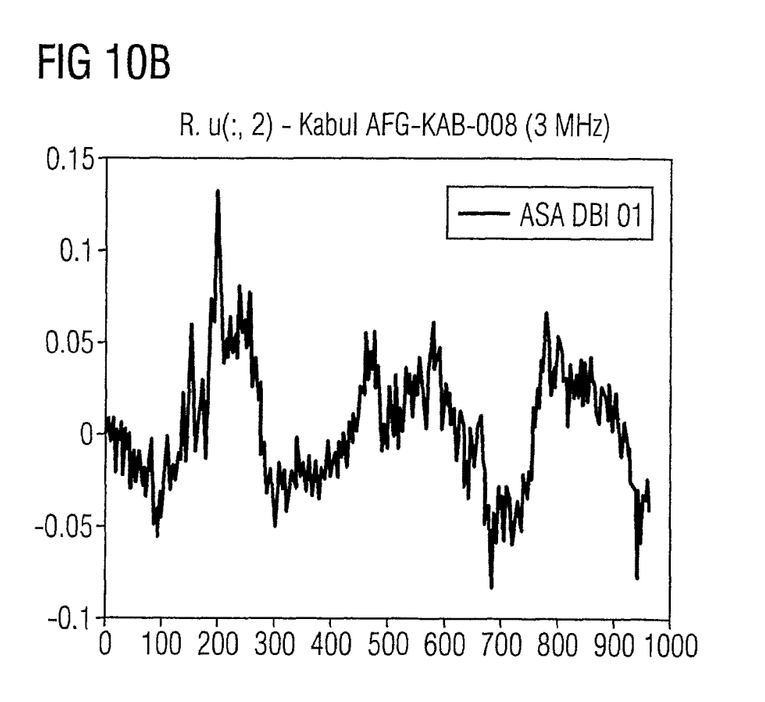
Figure 11A:
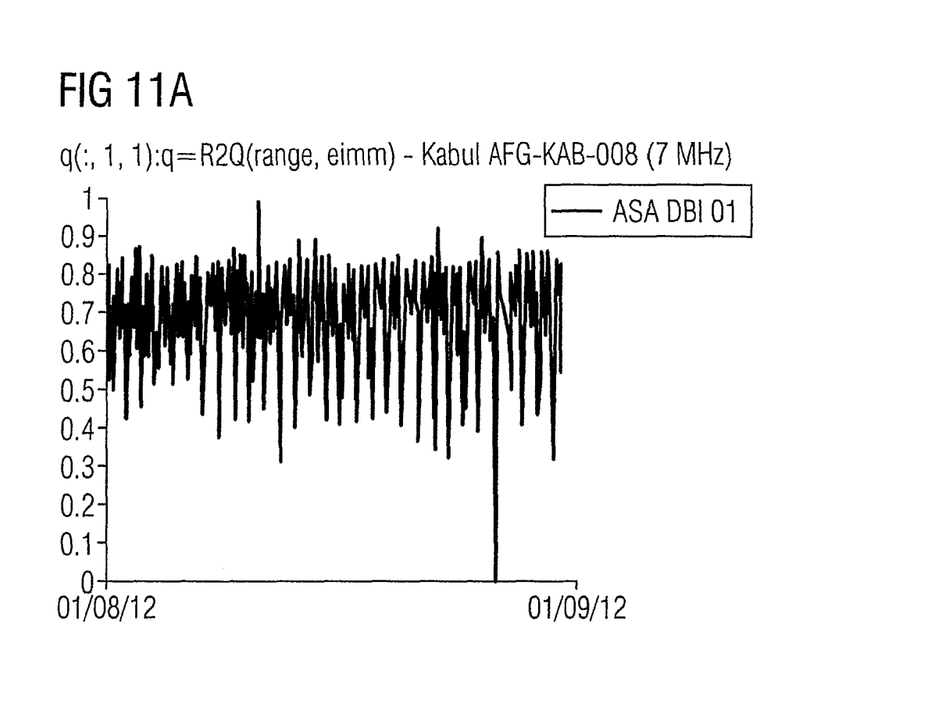
Figure 11B:
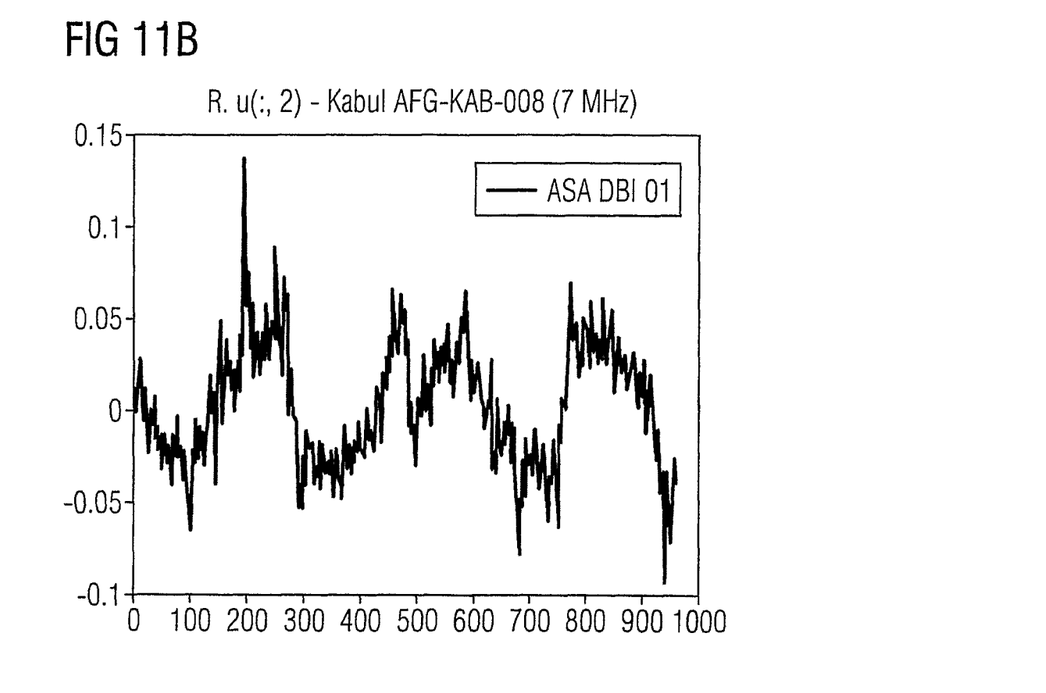

FIG. 8a shows the value of the first element of the sampling vector plotted over time. The data comes from a station in Rugby, Great Britain and shows the variation of the signal over one month. FIG. 8b shows the second column of the matrix V which is characteristic of the signal. FIG. 9a shows a further example of signal values of the same antenna with a different carrier within a timespan of one month. It can be seen from FIG. 9b that the time signals thus generated are very similar to the time signals shown in FIG. 8b. The selection of the second vector from the matrix V is therefore characteristic to a high degree of the respective transmitting station. By way of comparison, graphs analogous to FIGS. 8a and 8b are shown in each case in FIGS. 10a, 10b, 11a and 11b for a station in Kabul, Afghanistan. It can easily be recognized that the second column of the matrix V is to a high degree characteristic of the respective transmitting station.

In the preferred exemplary embodiment of the invention shown, it is a goal, via a plurality of prior known antenna signals which are stored in a database of historical data and from which the respective signal strengths of the known antenna are known, to select that antenna which has been identified as an interfering transmitter on account of an operator error. This method is based on the understanding that the signal strength of the antenna varies over time due to a multiplicity of influencing factors, in particular due to the movement of the satellite, atmospheric conditions or weather conditions, as well as changes in the signal gain or in the antenna alignment at the uplink station over time. It has become apparent that in this case there exist, among the individual transmitting stations, specific variation patterns of the signal strength that are characteristic of a particular antenna. With the preferred exemplary embodiment of the invention presented here, a signature for the variation in the signal strength is found for each transmitting station and for each carrier and a characteristic of the uplink antenna is determined.

The starting point of the method presented herein are signals in the form of signal strengths of a carrier over a specific period of time, where the signal strength is determined at equidistant acquisition time instants and, thus, generated measured values are stored. In the event that non-equidistant acquisition time instants for determining the signal strength are predefined or only values measured at non-equidistant acquisition time instants are available, an interpolation can be performed so that signals are available which contain sample values of the signal strength measured at equidistant acquisition time instants.

The signals are initially normalized in a further step. In the normalization described hereinbelow, the sliding average of the respective signal is calculated first. This is subsequently subtracted from the respective signal. FIG. 1 shows the respective raw data record of the signal. The signal values of the signal describe the power density of the respective signal in the form of an equivalent isotropic radiated power. FIG. 2b shows the signal that results when the sliding average is subtracted from the respective signal.

For the normalization, a normalization function is used which maps the individual sample values $E_i$ into a value range between 0 and 1. Instead of the normalization described here, different types of normalization can also be used. Thus, it is also possible, for example, to apply a threshold value function to the individual values by which values greater than 1 or less than 0 are set to the respective minimum or maximum threshold value.

Following the mapping of the sample values $E_i$ into the predefined normal interval, normalized sample values $p_i$ are available. In the present exemplary embodiment, the signal S is predefined by a vector of values $E=(E_1, E_2, \ldots, E_N)$. The normalized sample values $p_i$ are determined in accordance with the rule $p_i=(E_i+E_{max})/(2 E_{max})$. In this case, $E_{max}$ represents the maximum value of the absolute sum of the values occurring in the vector E for the total signal, and $E_i$ stands for each individual one of the elements of the vector E. A normalized sample value $p_i$ is subsequently available for each element $E_i$, where $1 \le i \le N$.

In a next step, a sampling vector $q_i$ having two elements is generated for each normalized sample value $p_i$. In the present exemplary embodiment, the individual sampling vectors $q_i$ are produced in accordance with the following relationship:

$$q_i = \begin{pmatrix} q_i \\ \bar{q}_i \end{pmatrix} = \begin{pmatrix} \sqrt{p_i} \\ \sqrt{1-p_{i_i}} \end{pmatrix}. \qquad \text{Eq. 2}$$

On account of this actual specification, each of the sampling vectors $q_i$ has a norm of 1, irrespective of how great the respective sample value $E_i$ is:

$$\|q_i\|=\sqrt{q_i^T q_i}=1. \qquad \text{Eq. 3}$$

As a result of this special transformation, $q_i$ represents a specific state of a two-state quantum system which, in the context of quantum information theory, is known as a qubit or "quantum bit".

FIG. 1 shows a signal consisting of a number of sample values $E_i$ which have been recorded over a period of three days with four measurements per day. In order to make specific signal fluctuations more easily visible, a running average of the signal is shown in FIG. 2a. and FIG. 2b shows the deviation of the recorded signal from the running average.

In a further step, a signal matrix M is formed from the individual normalized sample values $p_i$. For this purpose, a signal period duration is first predefined, which in the present exemplary embodiment is equal to 24 hours. However, multiples or divisors of one day can also be used as the signal period duration instead of one day. Using a signal period duration of 24 hours is by all means justified in relation to the periodicity of satellite signals, since the position of geostationary satellites varies essentially according to a daily rhythm because they complete an orbit around the earth within 24 hours. In the present exemplary embodiment, recourse is had to the individual sampling vectors $q_i$ which have each been recorded within the same day, relative to a specific point of the earth. Each sampling vector $q_i$ has two elements $q_i$, $\bar{q}_i$, each of which originates from the same signal period. These elements $q_i$, $\bar{q}_i$ are entered in the same row of the row matrix M. The first and second elements $q_i$, $\bar{q}_i$ of sampling vectors $q_i$ that were determined at the specific sampling time instant in relation to the start of the respective signal period are each arranged in the same column of the signal matrix M, with separate columns each being provided for the first and second element $q_i$, $\bar{q}_i$. In the present case, one row of the signal matrix, designated by $w_j$, each comprise all elements of a sampling vector $q_i$ which have been determined based on sample values from the same day. The index j, which represents the row index in relation to the signal matrix M, in each case designates the day or, as the case may be, the signal period for which the respective sampling vector $q_i$ was determined, and $1 \le j \le m$. In the present exemplary embodiment, the individual days are arranged in chronological order into the signal matrix M as row vectors $w_j$. However, this is by no means mandatory, so that a different arrangement of the individual vectors $w_j$ into the signal matrix M is also possible. Before the individual elements of the sampling vectors $q_i$ or of the vectors $w_j$ are entered into the signal matrix M, they are additionally normalized with a weighting value, such that each of the row vectors $w_j$ in each case satisfies the following relationship or condition:

$$\|w_j\| = \sqrt{w_j^T w_j} = 1. \qquad \text{Eq. 4}$$

In a preferred embodiment of the invention, the row vector $w_j$ is therefore yielded as:

$$w_j = \frac{1}{\sqrt{l}} (q_{(j-1)l+1}, q_{(j-1)l+2}, \ldots, q_{jl}, \bar{q}_{(j-1)l+1}, \bar{q}_{(j-1)l+2}, \ldots, \bar{q}_{jl}) \qquad \text{Eq. 5}$$

Each of the row vectors have twice as many entries as sample values $p_i$ available per signal period. If, as in the present case, $l=4$ measured values are available for a day, then the row vector $w_j$ has a number of $n=2l=8$ entries. In the present exemplary embodiment, measured values of three successive signal periods, i.e., three consecutive days, are used, with the result that the individual row vectors $w_1$, $w_2$, $w_3$ of the signal matrix S are yielded as follows:

$$w_1 = \frac{1}{\sqrt{4}} (q_1, q_2, q_3, q_4, \bar{q}_1, \bar{q}_2, \bar{q}_3, \bar{q}_4) \qquad \text{Eq. 6}$$

$$w_2 = \frac{1}{\sqrt{4}} (q_5, q_6, q_7, q_8, \bar{q}_5, \bar{q}_6, \bar{q}_7, \bar{q}_8) \qquad \text{Eq. 7}$$

$$w_3 = \frac{1}{\sqrt{4}} (q_9, q_{10}, q_{11}, q_{12}, \bar{q}_9, \bar{q}_{10}, \bar{q}_{11}, \bar{q}_{12}) \qquad \text{Eq. 8}$$

The individual values assigned to the measured value matrix M are once again divided by the root of the available rows $w_j$. The result of this is that a measured value vector s containing all elements of the measured value matrix M and having the form $$s = \frac{1}{\sqrt{3}} (w_1 \oplus w_2 \oplus w_3) \qquad \text{Eq. 9}$$

$$s = \frac{1}{\sqrt{12}} (q_1, q_2, q_3, q_4, \bar{q}_1, \bar{q}_2, \bar{q}_3, \bar{q}_4, q_5, q_6, q_7, q_8, \bar{q}_5, \bar{q}_6, \bar{q}_7, \bar{q}_8, q_9, q_{10}, q_{11}, q_{12}, \bar{q}_9, \bar{q}_{10}, \bar{q}_{11}, \bar{q}_{12}) \qquad \text{Eq. 10}$$

has the norm 1. A Schmidt decomposition can be performed in order to determine a meaningful comparison parameter for the characteristic of a recorded signal S. The 24-hour variation of the signal is determined by performing a Schmidt decomposition of the measured value vector s in accordance with the following relationship and by determining the values $a_i$ and the vectors $u_i$, $v_i$ as the result of the Schmidt decomposition of s.

$$s = \sum_{i=1}^{k} a_i u_i \otimes v_i, \qquad \text{Eq. 11}$$

where the vectors $u_i$ are orthonormal vectors of magnitude m, and $v_i$ are orthonormal vectors of magnitude n, and the $a_i$ are scalar values having a value greater than 0, and $k = \min\{m,n\}$.

A general form is therefore shown below in which, in total, signals from m days are available, where $n=2l$ elements of sampling vectors, that is to say l sample values, are available for each day:

$$M = \begin{pmatrix} s_1 & s_2 & \cdots & s_n \\ s_{n+1} & s_{n+2} & \cdots & s_{2n} \\ s_{2n+1} & s_{2n+2} & \cdots & s_{3n} \\ \vdots & \vdots & \ddots & \vdots \\ s_{(m-1)n+1} & s_{(m-1)n+2} & \cdots & s_{mn} \end{pmatrix} \qquad \text{Eq. 12}$$

In the present exemplary embodiment, the measured value matrix M then has the following structure:

$$M = \frac{1}{\sqrt{12}} \begin{pmatrix} q_1 & q_2 & q_3 & q_4 & \bar{q}_1 & \bar{q}_2 & \bar{q}_3 & \bar{q}_4 \\ q_5 & q_6 & q_7 & q_8 & \bar{q}_5 & \bar{q}_6 & \bar{q}_7 & \bar{q}_8 \\ q_9 & q_{10} & q_{11} & q_{12} & \bar{q}_9 & \bar{q}_{10} & \bar{q}_{11} & \bar{q}_{12} \end{pmatrix} \qquad \text{Eq. 13}$$

This exemplary embodiment represented here shows by way of example a measured value matrix M, in which four sample values $p_i$ are each available in three signal periods. A restriction of this type is by no means necessary, however. As a result of the singular value decomposition, the matrix M can be represented as a matrix product of three matrices:

$$M = USV^\dagger, \qquad \text{Eq. 14}$$

where U and V are unitary matrices. The column vectors of the matrix U are the vectors $u_i$, and the row vectors of the matrix $V^\dagger$ are the vectors $v_i$.

Each row of the matrix M describes a 24-hour variation profile of the signal, where as a result of the Schmidt decomposition characteristic eigensignals for the respective signal are determined that are contained in the vectors $v_i$.

An advantageous numeric implementation is described in E. Anderson, Z. Bai, C. Bischof, S. Blackford, J. Demmel, J. Dongarra, J. Du Croz, A. Greenbaum, S. Hammarling, A. McKenney, and D. Sorensen: LAPACK Users' Guide, Society for Industrial and Applied Mathematics, Philadelphia, Pa., third edition, 1999.

In relation to the present exemplary embodiment, the matrix U is a 3×3 matrix, the matrix S is a 3×8 matrix, and the matrix V is an 8×8 matrix. The matrix U (or its columns) shows in each case the variation of the occurring signal over the individual signal periods. The matrix $V^\dagger$ (or its rows) shows different components and variations within a signal period. As previously mentioned, time-of-day dependent fluctuations and variations may be characteristic of certain types of transmitters. Consequently, the time-of-day dependent fluctuations characteristic of the respective transmitter that are contained in the matrix $V^\dagger$ are particularly relevant for the numeric characterization of transmitters, whereas the changes over several days tend to be of secondary importance. For this reason, it is advantageous to represent the individual row vectors of the matrix $V^\dagger$ for the characterization of the signal S described by the signal matrix M.

Each individual signal components of the matrices U and $V^\dagger$ are represented in graphical form in FIGS. 4 to 7. FIG. 4a shows the first column of the matrix U and FIG. 4b shows the first row of the matrix $V^\dagger$. FIG. 5a shows the second column of the matrix U and FIG. 5b shows the second row of the matrix $V^\dagger$. FIG. 6 shows the third column of the matrix U. FIG. 7 shows the third row of the matrix $V^\dagger$.

It has been demonstrated that the first row vector of the matrix $V^\dagger$ contains the dominant component of the 24-hour variation of the signal, which is not especially characteristic of the respective transmitting unit or uplink antenna of the signal. What is characteristic of this is in particular the second row vector of the matrix $V^\dagger$, which in the present exemplary embodiment is called upon as a signature for further signal comparisons.

A characteristic comparison variable has therefore been determined for the signals S determined from the satellite data, where the comparison variable particularly enables a simple comparison between the signals. In the present case, a special exemplary embodiment of such a comparison is shown, where it is assumed that corresponding characteristic comparison parameters are already available for each of the individual satellite transmitter. If an interference signal occurs, a characteristic parameter can likewise be determined for the signal according to the same rule. In the present case, the two characteristic comparison parameters are designated by r and s. In order to obtain a measure for the dissimilarity between the two variables, the following exemplary dimension determination rule can be applied:

$$D(r,s) = \sqrt{1 - |\langle r,s \rangle|^2} . \qquad \text{Eq. 15}$$

With the special selection of this distance dimension, it is possible to specify specified that identical vectors each deliver a distance value of 0, whereas vectors that are orthogonal to one another each have a maximum distance of 1 from one another. If the signatures or characteristic comparison parameters have a low value, it can be assumed that the two characteristic comparison parameters produced each originate from the same antenna.

If a database of known antennas is available, then the source from which an interference signal originates can easily be ascertained.

For the present exemplary embodiment, the result of which is presented in the table, signals of eleven different antennas from six different cities were used in total, with possibly also more than one signal from individual stations having been determined and referenced. As can be clearly seen from the table, the comparison results bordered in bold, in which signals of the same antenna have been compared with one another in each case, each have very low values, whereas comparisons between the characteristic signals of different antennas have a very high value, in particular greater than 0.75. In this way it becomes possible to easily distinguish signals of different origin from one another and also to associate interference signals with a specific transmitter without difficulty. Signals originating from the same transmitter, on the other hand, have in each case values in the below-presented Table I that lie significantly below the values.

TABLE I

| C | Antenna Code | D (J1) | D (K1) | D (K3) | D (K4) | D (K5) | D (K7) | D (L1) | D (M1) | D (M3) | D (R1) | D (T1) |
|---|---|---|---|---|---|---|---|---|---|---|---|---|
| J1 | ISR-JER-006 | 0 | 0.932 | 0.995 | 1 | 1 | 0.997 | 1 | 0.983 | 0.99 | 0.999 | 0.992 |
| J2 | ISR-JER-006 | 0.62 | 0.93 | 0.995 | 1 | 1 | 0.998 | 1 | 0.984 | 0.991 | 0.999 | 0.991 |
| K1 | AFG-KAB-008 | 0.932 | 0 | 0.892 | 0.986 | 0.999 | 1 | 0.978 | 0.941 | 0.981 | 1 | 1 |
| K2 | AFG-KAB-008 | 0.911 | 0.425 | 0.908 | 0.982 | 0.993 | 1 | 0.979 | 0.95 | 0.977 | 0.999 | 1 |
| K3 | AFG-KAB-142 | 0.995 | 0.892 | 0 | 1 | 1 | 1 | 0.991 | 0.994 | 1 | 1 | 1 |
| K4 | AFG-KAB-040 | 1 | 0.986 | 1 | 0 | 1 | 0.999 | 1 | 1 | 0.999 | 0.994 | 0.996 |
| K5 | AFG-KAB-135 | 1 | 0.999 | 1 | 1 | 0 | 0.995 | 0.987 | 0.996 | 0.996 | 0.995 | 1 |
| K6 | AFG-KAB-135 | 0.996 | 0.999 | 0.999 | 1 | 0.643 | 0.983 | 0.983 | 0.994 | 0.996 | 0.998 | 1 |
| K7 | AFG-KAB-063 | 0.997 | 1 | 1 | 0.999 | 0.995 | 0 | 0.989 | 0.87 | 1 | 1 | 0.999 |
| L1 | POR-LIS-005 | 1 | 0.978 | 0.991 | 1 | 0.987 | 0.989 | 0 | 0.993 | 1 | 0.999 | 1 |
| M1 | POL-MMI-001 | 0.983 | 0.941 | 0.994 | 1 | 0.996 | 0.87 | 0.993 | 0 | 0.924 | 1 | 0.989 |
| M2 | POL-MMI-001 | 0.992 | 0.981 | 1 | 1 | 0.995 | 0.795 | 0.998 | 0.377 | 0.979 | 1 | 0.996 |
| M3 | POL-MMI-006 | 0.99 | 0.981 | 1 | 0.999 | 0.996 | 1 | 1 | 0.924 | 0 | 0.999 | 0.893 |
| R1 | UKI-RBY-006 | 0.999 | 1 | 1 | 0.994 | 0.995 | 1 | 0.999 | 1 | 0.999 | 0 | 0.995 |
| R2 | UKI-RBY-006 | 0.996 | 1 | 1 | 0.995 | 0.995 | 1 | 0.999 | 1 | 0.997 | 0.225 | 0.997 |
| R3 | UKI-RBY-006 | 0.998 | 0.999 | 1 | 0.995 | 0.994 | 1 | 1 | 1 | 0.996 | 0.227 | 0.996 |
| R4 | UKI-RBY-006 | 0.998 | 1 | 1 | 0.996 | 0.994 | 1 | 0.999 | 1 | 0.997 | 0.22 | 0.998 |
| R5 | UKI-RBY-006 | 0.997 | 1 | 1 | 0.996 | 0.994 | 1 | 0.999 | 1 | 0.997 | 0.206 | 0.994 |
| R6 | UKI-RBY-006 | 0.999 | 0.999 | 1 | 0.995 | 0.994 | 1 | 1 | 1 | 0.998 | 0.191 | 0.996 |
| T1 | ITA-TOR-022 | 0.992 | 1 | 1 | 0.996 | 1 | 0.999 | 1 | 0.989 | 0.893 | 0.995 | 0 |

The distance dimension used in the present exemplary embodiment and the formation of the individual elements of the sampling vectors are on no account to be understood as definitive. It should be understood it is possible to use complex-value sampling vectors $q_i$ instead of the real-value sampling vectors $q_i$ used, and in this way to incorporate additional information concerning the state of the individual signals. In lieu of the already specified formation rule of the sampling vector q, an alternative sampling vector can therefore be used which has the following structure:

$$q = \begin{pmatrix} e^{i\varnothing}\sqrt{p} \\ e^{i\chi}\sqrt{1-p} \end{pmatrix} \qquad \text{Eq. 16}$$

In order to be able to determine the agreement of two vectors for complex numbers, an alternative calculation rule can be specified instead of the formation of the inner product used for real numbers.

$$\langle r, s \rangle = r^\dagger s \qquad \text{Eq. 17}$$

With this type of formation of an inner product it is also possible to form a distance in accordance with the known relationship:

$$D(r, s) = \sqrt{1 - |\langle r, s \rangle|^2} \ . \qquad \text{Eq. 18}$$

For this case for the sampling vector q, the forming relationship is yielded:

$$\|q\| = \sqrt{q^\dagger q} = 1. \qquad \text{Eq. 19}$$

The terms Schmidt decomposition and singular value decomposition have been used in the foregoing. These two methods differ from each other simply with regard to the arrangement of the data, the Schmidt decomposition operating based on vectors s and the singular value decomposition based on a matrix M. The values contained in the vector s and in the matrix M are (exactly like the vectors $v_i$ and matrix V obtained as result) numerically identical.

Figure 12:
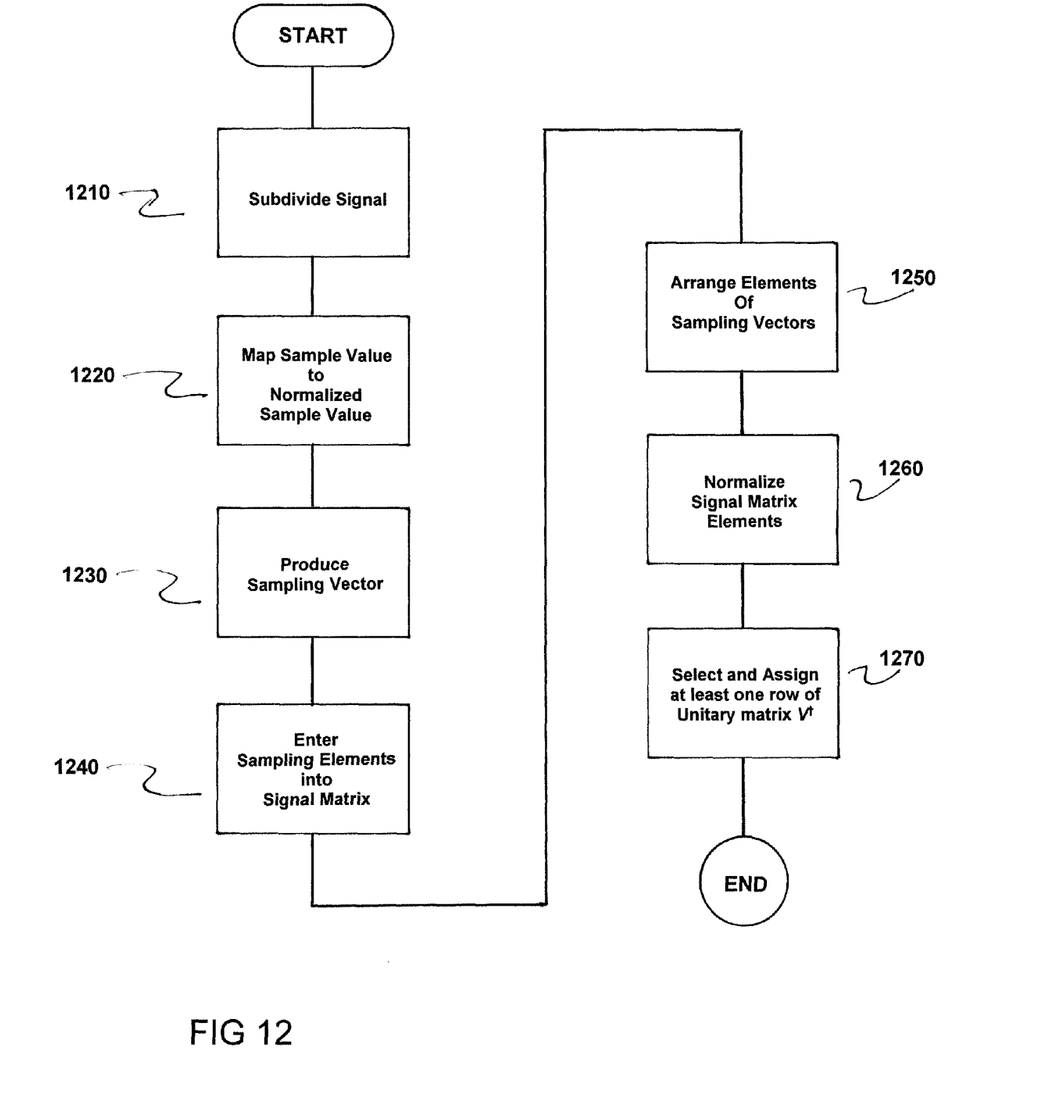
FIG. 12 is a flowchart of the method in accordance with the invention.

FIG. 12 is a flowchart of a method for identifying interfering transmitters from among a plurality of known satellite transmitters, where a signal (S) is determined for each satellite transmitter present via equidistant sampling of each respective signal strength and a comparison parameter for each satellite transmitter is determined for said signal (S). The method comprises subdividing the signal (S) into a number of succeeding signal periods of predefined equal length, as indicated in step 1210.

Each sample value ($E_i$) is now mapped b) via a constant and monotonically increasing or decreasing normalization function to a normalized sample value ($p_i$) within a predefined normal interval, as indicated in step 1220.

Next, a sampling vector ($q_i$) is produced c) having two elements for each normalized sample value ($p_i$), as indicated in step 1230. Here, the first element ($q_i$) of the sampling vector ($q_i$) corresponding to the normalized sample value ($p_i$) and the second element of the sampling vector ($\bar{q}_i$) are selected such that a vector norm applied to the sampling vector ($q_i$) yields a value of 1.

The first and second sampling elements ($q_i$, $\bar{q}_i$) of the sampling vectors ($q_i$) are now entered d) into a signal matrix (M), as indicated in step 1240. In accordance with the invention, elements originating from the same signal period are each entered in the same row of the signal matrix (M).

First and second elements ($q_i$, $\bar{q}_i$) of sampling vectors ($q_i$), which were each determined at a specific sampling time instant in relation to sample values ($E_i$, $p_i$) determined at a start of a respective signal period, are now arranged e) in the same column of the signal matrix (M), as indicated in step 1250. Here, separate columns being provided for each of the first and second element ($q_i$, $\bar{q}_i$).

Next, elements of the signal matrix (M) are normalized f) such that an application of a predefined vector norm to the signal matrix (M) always yields the value of 1, or g) performing a singular value decomposition of the signal matrix (M) into a product representation in accordance with the following relationship $M = USV^\dagger$ is performed, as indicated in step 1260. In this case, U and V are each unitary matrices.

At least one row of a unitary matrix $V^\dagger$ determined for the respective signal (S) is now selected h) as a comparison parameter and assigning the at least one row to the respective signal (S) to prepare the respective signal (S) for the comparison, as indicated in step 1270.

In accordance with the invention, upon detection of an interfering transmitter for the signal emitted by the interfering transmitter, an interference signal is determined in each case via equidistant sampling for each respective signal strength and a comparison parameter is likewise determined for said interference signal, for the determination of the comparison parameter for the respective signal and the comparison parameter for the interference signal, each of which is performed in accordance with steps 1210 to 1270. IN addition, the comparison parameter for the interfering transmitter is compared with each of the comparison parameters for the transmitters and, in each case, a dimension value is held available which indicates a degree to which the signal of the interfering transmitter matches the signal of the respective satellite transmitter.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for identifying interfering transmitters from among a plurality of known satellite transmitters, wherein a signal is determined for each satellite transmitter present via equidistant sampling of each respective signal strength and a comparison parameter for each satellite transmitter is determined for said signal, the method comprising:
    a) subdividing the signal into a number of succeeding signal periods of predefined equal length;
    b) mapping each sample value via a constant and monotonically increasing or decreasing normalization function to a normalized sample value within a predefined normal interval;
    c) producing a sampling vector having first and second sampling elements for each normalized sample value, a first element of said sampling vector corresponding to the normalized sample value and a second element of said sampling vector being selected such that a vector norm applied to the sampling vector yields a value of 1;
    d) entering the first and second sampling elements of the sampling vectors into a signal matrix, elements originating from the same signal period each being entered in the same row of the signal matrix;
    e) arranging first and second sampling elements of sampling vectors which were each determined at a specific sampling time instant in relation to sample values determined at a start of a respective signal period in the same column of the signal matrix, separate columns being provided for each of the first and second sampling element;

f) normalizing elements of the signal matrix such that an application of a predefined vector norm to the signal matrix always yields the value of 1, or g) performing a singular value decomposition of the signal matrix into a product representation in accordance with the following relationship:

$M=USV^\dagger$, where U and $V^\dagger$ are each unitary matrices, M being the signal matrix and S being a matrix; and h) selecting at least one row of a unitary matrix $V^\dagger$ determined for the respective signal as a comparison parameter and assigning the at least one row to the respective signal to prepare the respective signal for the comparison parameter; wherein upon detection of an interfering transmitter for the signal emitted by the interfering transmitter, an interference signal is determined in each case via equidistant sampling for each respective signal strength and the comparison parameter is likewise determined for said interference signal, for the determination of the comparison parameter for the respective signal and the comparison parameter for the interference signal, each of which is performed in accordance with steps a) to h); and wherein the comparison parameter for the interfering transmitter is compared with each of the comparison parameters for the transmitters and, in each case, a dimension value is held available which indicates a degree to which the signal of the interfering transmitter matches the signal of the respective satellite transmitter.

2. The method as claimed in claim 1, wherein the first and second sampling elements of sampling vectors are each ordered into columns of the signal matrix such that:

first elements originating from an earlier sampling time instant are each arranged into columns having a smaller column index than first elements originating from a later sampling time instant; and second elements originating from an earlier sampling time instant are each arranged into columns having a smaller column index than second elements originating from the later sampling time instant.

3. The method as claimed in claim 1, wherein the first and second sampling elements of sampling vectors are each ordered into columns of the signal matrix such that, in the signal matrix having n=2l columns one of:

(i) all of the first elements are arranged into columns 1 to l of the signal matrix and all of the second elements are arranged into columns l+1 to 2l of the signal matrix, and (ii) the first and second elements created at the same i-th sampling time instant are each arranged in the columns 2i−1 and 2l of the signal matrix, where 1≤i≤l, and n, i and l are integers.

4. The method as claimed in claim 1, wherein the signal is assigned at least one row of the unitary matrix $V^\dagger$ as the comparison parameter.

5. The method as claimed in claim 4, wherein the signal is assigned to the second row of the unitary matrix $V^\dagger$.

6. The method as claimed in claim 1, further comprising:
determining a maximum value and a minimum value of the sample values of the respective signal to map the respective signal to a normal interval;
wherein, for the maximum sample value, the first element is set to a maximum interval value, and the second element is set to a value of 0; and wherein, for the minimum sample value, the second element is set to the maximum interval value, and the first element is set to the value 0.

7. The method as claimed in claim 6, wherein the maximum interval value is the value 1.

8. The method as claimed in claim 1, wherein an entirety of the signal matrix is multiplied by a weighting factor w which corresponds to a reciprocal of a root of half of a number of matrix elements.

9. The method as claimed in claim 8, wherein the weighting factor w is chosen in accordance with the relationship:

$$w = \sqrt{\frac{2}{mn}},$$

where m corresponds to a number of rows and n corresponds to a number of columns of the signal matrix.

10. The method as claimed in claim 1, wherein sampling time instants and equidistant sampling intervals are predefined in advance within the signal period; wherein an interpolation function having a signal shape predefined by signal values and the sampling time instants and equidistant sampling intervals is determined for the signal; and wherein the comparison parameter for the signal is determined based on a further signal which is determined by sampling the interpolation function at the predefined sampling time instants.

11. The method as claimed in claim 1, wherein one day or time period equivalent to the one day is used in each case as a duration of the signal periods.

12. The method as claimed in claim 1, wherein a satellite transmitter for which a dimension value has been determined indicating a great degree of agreement is identified as the interfering transmitter.

13. The method as claimed in claim 12, wherein the dimension value indicates a greatest degree of agreement.

14. The method as claimed in claim 1, wherein the predefined normal interval is between 0 and 1.

15. A non-transitory data medium having a stored program, which when executed, performs the method as claimed in claim 1.

* * * * *